(12) United States Patent
Kudou et al.

(10) Patent No.: US 6,930,145 B2
(45) Date of Patent: Aug. 16, 2005

(54) POLYOXYMETHYLENE RESIN COMPOSITION AND MOLDED ARTICLES MADE THEREFROM

(75) Inventors: Syuichi Kudou, Kurashiki (JP); Mitsuhiro Horio, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 487 days.

(21) Appl. No.: 10/024,174

(22) Filed: Dec. 21, 2001

(65) Prior Publication Data

US 2002/0123570 A1 Sep. 5, 2002

(30) Foreign Application Priority Data

Dec. 26, 2000 (JP) ........................................ 2000-396066

(51) Int. Cl.[7] ............................ C08K 3/04; C08K 3/18; C08L 51/06; C08L 59/02; C08L 77/12
(52) U.S. Cl. ..................... 525/66; 524/538; 524/542
(58) Field of Search ............................... 524/538, 542; 525/66, 64

(56) References Cited

U.S. PATENT DOCUMENTS

| 5,244,973 | A | | 9/1993 | Sakazume et al. ............ 525/66 |
|---|---|---|---|---|
| 5,652,326 | A | * | 7/1997 | Ueda et al. .................. 528/288 |
| 5,854,324 | A | * | 12/1998 | Tajima et al. ................ 524/232 |
| 6,221,946 | B1 | | 4/2001 | Niino et al. .................. 524/405 |
| 6,512,047 | B2 | * | 1/2003 | Kim et al. ..................... 525/66 |

FOREIGN PATENT DOCUMENTS

| JP | 59-104652 A | | 6/1984 | |
|---|---|---|---|---|
| JP | 59-191752 A | | 10/1984 | |
| JP | 04168145 A | * | 6/1992 | ........... C08L/59/00 |
| JP | 06240105 A | * | 8/1994 | ........... C08L/59/00 |
| JP | 7-188475 A | | 7/1995 | |

* cited by examiner

*Primary Examiner*—Robert Sellers
(74) *Attorney, Agent, or Firm*—Birch, Stewart, Kolasch & Birch, LLP

(57) ABSTRACT

Polyoxymethylene resin composition comprising 40 to 99.5 parts by weight of polyoxymethylene resin (A), and 0.5 to 60 parts by weight of resin consisting of a polyamide elastomer (B) and an acid-modified olefinic resin (C) having an acid modification rate of 0.05 to 15 wt. %, a ratio of (B)/(c) being in a range of 10/90 to 90/10 % by weight, has a much distinguished impact resistance and a good antistatic property, while maintaining the heat stability inherent to the polyoxymethylene resin, as compared with the conventional one, and is suitable for use in OA appliances, VTR appliances, music-image-information appliances, communication appliances, automobile interior and exterior furnishings and industrial sundries.

6 Claims, No Drawings

POLYOXYMETHYLENE RESIN COMPOSITION AND MOLDED ARTICLES MADE THEREFROM

This nonprovisional application claims priority under 35 U.S.C. §119(a) on Patent Application No. 2000-396066 filed in JAPAN on Dec. 26, 2000, which is herein incorporated by reference.

BACKGROUND OF THE INVENTION

The present invention relates to polyoxymethylene resin compositions. Molded articles of the present polyoxymethylene resin composition are suitable for use in parts of precision devices, household electrical appliances, office automation (OA) appliances, automobiles, industrial materials, sundry goods, etc.

Polyoxymethylene resins have been widely used as engineering resins having balanced mechanical properties and distinguished wear resistance and thus have been widely used not only in various mechanical working components, but also in OA appliances, etc. However, conventional polyoxymethylene resins do not have satisfactory impact resistance.

Therefore, attempts have been made to obtain resin compositions by blending the polyoxymethylene resin compositions with elastomer components. For example, U.S. Pat. Nos. 4,804,716 and 4,978,725 disclose the art of blending polyoxymethylene resins with polyurethane resins. U.S. Pat. No. 4,277,577 discloses the art of blending polyoxymethylene resins with olefinic elastomers and polyurethanes. U.S. Pat. No. 4,665,126 discloses the art of blending polyacetal resins with multilayered interpolymers and thermoplastic polyurethanes. EP-A-290761 discloses the art of blending polyoxymethylene resins with thermoplastic polyurethanes and polyether block copolyamides. JP-A-8-183115 discloses the art of blending polyacetal resins with polyalkylene oxides.

In these disclosures, the art of blending polyoxymethylene resin with polyurethane is the most practical, but the resulting polyurethane resins have such problems as (1) higher cost, (2) poor slidability, (3) poor strength at the welded parts of molded articles, etc.

It has been also proposed to blend polyoxymethylene resins with polyamide elastomer such as are used in the present invention. For example, JP-A-59-191752 discloses resin compositions with good anti-static properties, prepared by blending polyacetal resins with polyether ester amides. JP-A-63-110245 discloses resin compositions with good impact resistance and anti-static properties, composed of polyacetal resins and polyether ester amides. U.S. Pat. No. 5,043,399 discloses resin compositions with good impact resistance and anti-static properties, composed of polyacetal resins and polyether ester amides. JP-A-4-168145 discloses resin composition with good mechanical properties, anti-static properties and frictional wear resistance, composed of polyacetal resins, polyether ester amides and lubricants. JP-A-4-370156 discloses resin compositions with good anti-static properties and impact resistance, composed of polyacetal resin-containing thermoplastic resins and modified polyamide elastomers prepared by graft polymerization of polyamide elastomers selected from polyether amides, polyether ester amides and polyester amides with 1,2-alkylene oxides.

However, these resin compositions are considerably poorer in impact resistance as compared with resin compositions containing the above-mentioned polyurethanes, and also do not have a satisfactory level of frictional wear resistance.

As for the art of using acid-modified olefinic resins as used in the present invention, U.S. Pat. No. 4,556,690 discloses resin compositions composed of polyacetal resins and acid-modified α-olefin copolymers. However, polyacetal resins are not resistant to acids, so that the polyacetal resin is sometimes decomposed when kneaded at elevated temperatures under high shearing conditions, and the impact resistance of the resulting resin compositions is quite poor, as compared with that of the above-mentioned resin compositions prepared by blending polyoxymethylene resins with polyurethanes.

Also in the art of using polyamide elastomers and acid-modified olefin copolymers, U.S. Pat. No. 5,652,326 discloses resin compositions comprising polyolefinic resins, polyether ester amides, polyester resins, and/or polyacetal resins, and modified low molecular weight polyolefins. However, the resin compositions disclosed therein are basically dispersions of other components in the polyolefinic resins, where the object of adding polyacetal resins thereto is to facilitate exudation of polyether ester amides to the resin surface.

SUMMARY OF THE INVENTION

As a result of extensive studies of impact resistance-improved materials to be blended with a polyoxymethylene resin to improve the impact resistance of the polyoxymethylene resin, the present inventors have found that resin compositions comprising (A) a polyoxymethylene resin, (B) a polyamide elastomer and (C) an acid-modified olefinic resin with a specific acid modification rate, a ratio of (B)/(C) being in a specific range, can have an excellent impact resistance. This impact resistance is equivalent or superior to that of the resin compositions prepared by blending polyoxymethylene resin with polyurethane, without impairing the heat stability of the polyoxymethylene resin, and also solves the problems of slidability and weld strength which are inherent in the resin compositions prepared by blending polyoxymethylene resin with polyurethane.

Specifically, the present invention includes the following embodiments:

1. A polyoxymethylene resin composition, which comprises a polyoxymethylene resin (A), a polyamide elastomer (B) and an acid-modified olefinic resin (C) having an acid modification rate of 0.05 to 15% by weight, wherein an amount of the component (A) is 40 to 99.5 parts by weight per 100 parts by weight of the composition, the weight total of the component (B) and the component (C) is 0.5 to 60 parts by weight per 100 parts by weight of the composition, and a ratio of the component (B) to the component (C) is in a range of 10/90 to 90/10% by weight.

2. A polyoxymethylene resin composition according to the above-mentioned item 1, wherein the component (A) is in a continuous phase, and the component (B) and the component (C) are in a dispersed phase of spherical shapes or overlapped spherical particle shapes, the particle size of the dispersed phase being 0.01 to 20 μm.

3. A polyoxymethylene resin composition according to the above-mentioned item 1 or 2, further comprising 0.1 to 10 parts by weight of a lubricant (D) and/or 0.1 to 150 parts by weight of an inorganic filler (E) per 100 parts by weight of the polyoxymethylene resin composition.

4. A molded article obtained by molding of the polyoxymethylene resin composition according to any one of the above-mentioned items 1 to 3.

5. An article of manufacture selected from the group consisting of mechanical working components, outsert chassis resin components, chassis structures, trays and side plates obtained by molding, cutting, or molding and cutting the polyoxymethylene resin composition according to any one of the above-mentioned items 1 to 3.

6. The article according to the above-mentioned item 5, wherein the mechanical working component is at least one kind of parts selected from the group consisting of gears, cams, sliders, levers, arms, clutches, joints, shafts, bearings, key stems and key tops.

7. The article according to the above-mentioned item 5 or 6, for use in OA appliances.

8. The article according to the above-mentioned item 5 or 6, for use in video appliances.

9. The article according to the above-mentioned item 5 or 6, for use in music, image and information appliances.

10. The article according to the above-mentioned item 5 or 6, for use in communication appliances.

11. The article according to the above-mentioned item 5 or 6, for use in automobile interior and exterior furnishings.

12. The article according to the above-mentioned item 5 or 6, for use in industrial sundries.

DETAILED DESCRIPTION OF THE INVENTION

The polyoxymethylene resin (A) for use in the present invention includes: homopolymers obtained by polymerizing formaldehyde or cyclic oligomers of formaldehyde such as trioxane as its trimer, tetraoxane as its tetramer, etc. and terminated with ether or ester groups at both ends of the polymer; oxymethylene copolymers containing 0.1 to 20 mol. % of oxyalkylene units having 2 to 8 carbon atoms on the basis of the oxymethylene obtained by copolymerizing formaldehyde, trioxane as its trimer or tetraoxane as its tetramer, with ethylene oxide, propylene oxide, 1,3-dioxolane, formal of glycol, formal of diglycol, etc., and those with branched molecular chains; oxymethylene block copolymers containing not less than 50% by weight of segments consisting of oxymethylene units and not more than 50% by weight of different segments, etc. Oxymethylene block copolymers are preferably block copolymers of polyalkylene glycol and a polyoxymethylene homopolymer as disclosed in U.S. Pat. No. 4,377,667 or block polymers of hydrogenated polybutadiene and an oxymethylene copolymer, as disclosed in WO 01/09213. The disclosures of both of these documents are hereby expressly incorporated herein by reference.

Various selections of these polymers can be used, depending on desired purposes. From the viewpoint of slidability or rigidity, oxymethylene homopolymers or oxymethylene copolymers having a low comonomer content are preferable, whereas from the viewpoint of the heat stability or impact resistance, oxymethylene copolymers having a high comonomer content or block copolymers of hydrogenated polybutadiene and an oxymethylene copolymer are preferable.

The melt index (MI) of polyoxymethylene resins for use in the present invention is preferably in a range of 0.5–100 g/10 min., more preferably 1.0–80 g/10 min. (This MI is measured on the basis of ASTM-D1238-57 T). Below 0.5 g/10 min., molding becomes difficult, whereas above 100 g/10 min. durability becomes unsatisfactory in some cases.

For the polyoxymethylene resin of the present invention, stabilizers conventionally used in polyoxymethylene resins, for example, a heat stabilizer and a weather (light) resistant stabilizer, can be used, alone or in combination thereof.

Use of an antioxidant and/or a formaldehyde- or formic acid-trapping agent or simultaneous use thereof is effective for heat stabilization.

The antioxidant is preferably a hindered phenol-based antioxidant, for example, triethyleneglycol-bis-(3-(3-t-butyl-5-methyl-4-hydroxyphenyl)-propionate), tetrakis-(methylene-3-(3',5'-di-t-butyl-4'-hydroxyphenyl)-propionatemethane, etc.

Formaldehyde- or formic acid-trapping agents include, for example, (a) formaldehyde reactive nitrogen-containing compounds and polymers, and (b) hydroxides, inorganic acid salts, carboxylates, or alkoxides of alkali metals or alkaline earth metals.

Said compound (a) includes, for example, dicyandiamide, melamine, melamine-formaldehyde polycondensate, polyamide resin, poly-β-alanine, polyacrylamide, etc.

Said compound (b) includes, for example, hydroxides of sodium, potassium, magnesium, calcium, barium, etc. and carbonates, phosphates, silicates, borates and carboxylates of the aforementioned metals. Specifically, calcium salts are most preferable, and includes, for example, calcium hydroxide, anhydrous calcium carbonate, calcium phosphate, calcium silicate, calcium borate, and calcium carboxylates (calcium stearate, calcium myristate, etc.)

The weather (light) resistant stabilizer is preferably (a) benzotriazole-based compounds, (b) oxalanilide-based compounds and (c) hindered amine-based compounds. These compounds may be used alone or in combination of at least two thereof. Among them, combinations of at least one of the benzotriazole-based compounds and the oxalanilide-based compounds with the hindered amine based compound are particularly preferable.

The polyamide elastomer (B) for use in the present invention includes, for example, polyether ester amides, polyether amides, etc.

Polyether ester amides are block copolymers of polyamides having carboxyl groups at both terminals and alkylene oxide adducts of polyether or bisphenol.

Polyamides having carboxyl groups at both terminals include, for example, (1) ring-opened polymers of lactam, (2) polycondensates of aminocarboxylic acid, (3) polycondensates of dicarboxylic acid and diamine, etc. Polyethers include, for example, polyalkylene oxides having ring-opened alkylene oxides with 2 to 4 carbon atoms as structural units.

The number average molecular weight of polyamides used in the invention is preferably from about 300 to about 15,000, more preferably from 500 to 5,000, whereas molecular weight of polyether block units of alkylene oxide adducts of polyether or bisphenol used in the invention is preferably from about 200 to about 8,000, more preferably from 500 to 3,000.

A process for producing such polyether ester amides is disclosed in the above-mentioned JP-A-59-191752, U.S. Pat. No. 5,652,326, etc. Polyether ester amides can be also produced by processes disclosed in detail in U.S. Pat. Nos. 4,230,838, 4,332,920, 4,207,410, 4,345,064, 4,429,081, etc.

Polyether amides can be produced by polycondensation of (1) polyamide-formable monomer and (2) polyethers having amino terminals and/or carboxyl terminals and (3) by copoly-condensation of the terminals of (2) with a substantially equivalent weight of aliphatic, alicyclic, and aromatic dicarboxylic acids and/or diamines. Such polyether amides can be produced by process disclosed in the above-mentioned JP-A-4-168145, etc., which document is hereby expressly incorporated herein by reference.

The molecular weight of the resulting polyamide elastomers is not particularly limited, but generally ranges from about 1,000 to about 50,000, preferably from 10,000 to 40,000. The structural ratio of the lactam component or polyamide component to the polyether component of the polyamide elastomer (lactam component or polyamide component): (polyether component) is generally 15–90 wt. %: 85–10 wt. %, preferably 20–80 wt. %: 80–20 wt. %. When the ratio of the polyamide component is less than 15 wt. %, bonding to acid-modified olefinic resin becomes insufficient in some cases, whereas when the ratio of the polyether block is less than 10 wt. %, adhesive strength at the boundary to the polyoxymethylene resin will be sometimes lowered. Needless to say, at least two each of the polyether ester amides and polyether amides can be used together.

The acid-modified olefinic resin (C) for use in the present invention can be obtained by modifying homopolymers of α-olefins such as ethylene, propylene, butene-1, pentene-1, 4-methylpentene-1, hexene-1, heptene-1, octene-1, nonene-1, decene-1, undecene-1, dodecene-1, etc. or copolymers (random, block or graft polymers) of said α-olefins and monomers copolymerizable with such α-olefins by α,β-unsaturated carboxylic acid (acrylic acid, methacrylic acid, maleic acid, fumaric acid, itaconic acid, citraconic acid, nadic acid, etc.) and/or its acid anhydride (if necessary, together with peroxide). The acid-modified olefinic resins can be also obtained by copolymerization of these olefins with an acid anhydride.

Monomers copolymerizable with said α-olefins include, for example, conjugated diene components (butadiene, isoprene, piperylene, etc.), non-conjugated dienes (1,4-hexadiene, cyclopentadiene, 5-ethylidenenorbornene, 2,5-norbonadiene, etc.), (meth)acrylic acid or its ester derivatives (methyl methacrylate, etc.), (meth)acrylonitrile, aromatic vinyl monomers (styrene, α-methylstyrene, vinyltoluene, p-t-butylstyrene, etc.), vinyl ethers (vinylmethylether, etc.), vinyl esters (vinyl acetate, etc.).

The acid modification rate can be determined by dissolving a resin sample in hot xylene, followed by titration with sodium methylate, using phenolphthalein as a indicator. In the present invention, the acid modification rate of acid-modified olefinic resins is 0.05 to 15% by weight, preferably 0.1 to 10% by weight.

When the acid rate is less than 0.05% by weight, bonding to polyamide in the component (B) becomes unsatisfactory, so that control of dispersed particle sizes will be hard to make, resulting in lowering of the impact strength, whereas when the acid modification rate exceeds 15% by weight, the remaining unreacted acid groups will be increased, resulting in lowering of the heat stability.

The weight average molecular weight of the acid-modified olefinic resin (C) is preferably in a range of 5,000 to 500,000.

At least two kinds of acid-modified olefinic resins having different resin compositions, molecular weights, and acid modification rates can be used, or a mixture of the acid-modified olefinic resin with unmodified olefinic resin can be also used.

In the present invention, from about 40 to about 99.5 parts by weight, and preferably from 45 to 99.0 parts by weight, of the component (A) is used on the basis of 100 parts by weight of the polyoxymethylene resin composition. The sum total of the component (B) and the component (C) to be used is from about 0.5 to about 60 parts by weight, preferably from 1 to 55 parts by weight, on the basis of 100 parts by weight of the polyoxymethylene resin composition. When the amount of the component (A) is less than 40 parts by weight on the basis of 100 parts by weight of the polyoxymethylene resin composition, the appearance will be deteriorated, whereas when the amount of the component (A) exceeds 99.5 parts by weight on the basis of 100 parts by weight of the polyoxymethylene resin composition, the improvement of the impact resistance and slidability will not be sufficient.

In the present invention, a ratio by weight of polyamide elastomer (B) to acid-modified olefinic resin (C), i.e. a ratio by weight of the component (B)/the component (C), is in a range of from 10/90 to 90/10% by weight, preferably from 15/85 to 85/15% by weight, more preferably from 20/80 to 80/20% by weight. When the ratio by weight of the component (B) is less than 10% by weight, the polyoxymethylene resin will be decomposed by the acid component of the acid-modified olefinic resin during extrusion, or compatibility with the polyoxymethylene resin will be deteriorated, resulting in failure to maintain the particle size of the dispersed phase in a preferable range, as will be described later, whereas the ratio by weight of the component (C) is less than 10% by weight, the impact resistance will be lowered.

Furthermore, the proportion of acid group to amide group in polyether ester amide (B) and acid-modified olefinic resin (C) is in a range of 0.1–50 moles, preferably 0.5–40 moles, of the acid group to 100 moles of the amide group. When the proportion of the acid group exceeds 50 moles, polyoxymethylene resin decomposition by the remaining acid groups during the extruding processing may occur, whereas when the proportion of the acid group is less than 0.1 mole, control of particle size of the dispersed phase, as will be described later, will be hard to achieve, resulting in insufficient effect on the improvement impact resistance in some cases.

In the present resin composition, it is preferable that the polyoxymethylene resin (A) is in a continuous phase, whereas the components of the polyether ester amide (B) and the acid-modified olefinic resin (C) are in a dispersed phase of spherical shapes or overlapped spherical particle shapes. Furthermore, the particle size of the dispersed phase in a range of preferably from about 0.01 to about 20 μm, more preferably from 0.05 to 15 μm, most preferably from 0.1 to 10 μm. When the particle size of the dispersed phase exceeds 20 μm, the impact resistance will be lowered and the surface appearance will be deteriorated in some cases.

In the present invention, the method of adding the polyamide elastomer (B) and the acid-modified olefinic resin (C) to the polyoxymethylene resin (A) is not particularly limited and includes, for example, a method of individually adding the polyamide elastomer (B) and the acid-modified olefinic resin (C) to the polyoxymethylene resin (A) and a method of kneading the polyamide elastomer (B) with the acid-modified olefinic resin (C) in advance, followed by addition of the resulting mixture to the polyoxymethylene resin (A).

In the present invention, a lubricant (D) can be added to the polyoxymethylene resin composition. Such lubricants include, for example, silicone compounds, alcohols, fatty acids, esters of alcohols and fatty acids, esters of alcohols and dicarboxylic acids, polyoxyalkylene glycols, olefinic compounds having an average polymerization degree of 10 to 500, etc.

Silicone compounds are preferably olefinic resins grafted with silicone gum or silicone gum.

Alcohols and fatty acids include well known compounds and are not particularly limited.

Esters of alcohols and fatty acids are also not particularly limited, but esters of fatty acids having 12 or more carbon atoms and alcohols are preferable. Esters of fatty acids having 12 or more carbon atoms and alcohols having 10 or more carbon atoms are more preferable. Esters of fatty acids having 12 to 30 carbon atoms and alcohols having 10 to 30 carbon atoms are most preferable.

Esters of alcohols and dicarboxylic acids are also not particularly limited, but esters of alcohols having 10 or more carbon atoms and dicarboxylic acids are preferable.

Polyoxyalkylene glycol compounds are preferably (1) polycondensates of alkylene glycol monomers, (2) ether compounds of (1) and aliphatic alcohols, and (3) ester compounds of (1) and higher fatty acids.

Olefinic compound having an average polymerization degree of from 10 to 500 includes, for example, compounds obtained by polymerization or copolymerization of olefinic monomers or diolefinic monomers. In case that the olefinic compounds are those obtained by polymerization of diolefic monomers, it is preferable from the viewpoint of heat stability to use olefinic compounds with minimized carbon-carbon unsaturated bonds according to the conventional hydrogenation process.

The average polymerization degree of olefinic compound-constituting olefin units is preferably 10 to 500, more preferably 15 to 300, most preferably 15 to 100. When the average polymerization degree is less than 10, there will be a possibility of lowering the long-term sliding characteristics and also a cause for mold contamination. When the average polymerization degree is more than 500, the initial sliding characteristics will be largely lowered.

When a lubricant is added to the present resin composition, the amount of the lubricant is preferably from about 0.1 to 10 parts by weight, more preferably from 0.2 to 7 parts by weight, most preferably from 0.2 to 5 parts by weight, on the basis of 100 parts by weight of the polyoxymethylene resin composition consisting of the components (A), (B) and (C). When the amount of the lubricant is less than 0.1 parts by weight, the effect on the improvement of slidability will be insufficient, whereas the amount of lubricant is more than 10 parts by weight, the wear rate will be increased and occurrence of peeling will be increased.

In the present invention, an inorganic filler (E) can be added to the polyoxymethylene resin composition. The inorganic filler includes fibrous, granular, plate-like, and hollow inorganic fillers.

Particle sizes and amounts of these fillers depend on the uses and objects of the individual fillers and thus are not particularly restricted, but may be described in relation to their uses and objects as follows:

(1) To Give Good Surface Appearance and Slidability to Molded Articles:

It is preferable from the viewpoint of imparting desirable surface appearance and slidability to molded articles to use inorganic fillers having particle sizes of not more than 100 $\mu$m in terms of volume average particle size, more preferably not more than 50 $\mu$m, most preferably not more than 30 $\mu$m. Inorganic fillers for use for the purpose are preferably potassium titanate whiskers, wollastonite (acicular and granular), calcium carbonate, talc, graphite, nepheline, syenite, hydroxyapatite, silica, carbon black, and kaolin. Particularly preferable are potassium titanate whiskers, wollastonite (acicular and granular), calcium carbonate, talc and carbon black.

(2) To Give Rigidity:

It is preferable from the viewpoint of imparting a high level of rigidity to molded articles to use glass fibers, glass flakes, carbon fibers, mica, etc.

(3) To Give Electroconductivity:

From the viewpoint of imparting an electroconductivity to molded articles, carbon black, electroconductive carbon black, carbon nonatube, carbon fibers, etc. can be used.

Any of surface-treated and surface-untreated fillers can be used for the inorganic fillers, but surface-treated fillers are sometimes preferable from the viewpoint of surface flatness and mechanical properties of molded articles.

When an inorganic filler is added to the present resin composition, the amount of the inorganic filler is in a range of preferably 0.5 to 150 parts by weight, more preferably 1 to 100 parts by weight, on the basis of 100 parts by weight of the polyoxymethylene resin consisting of components (A), (B) and (C). Less than 0.5 parts by weight is not preferable, because the reinforcing effect of the filler will be not satisfactory, whereas more than 150 parts by weight is also not preferable, because the surface appearance will be poorer and the molding workability and impact resistance will be lowered.

The present polyoxymethylene resin composition can further contain various additives as used in conventional polyoxymethylene resin compositions, such as lubricants other than the aforementioned, impact resistance-improving agents, other resins, crystal nucleating agents, mold-releasing agents, dyes, pigments, etc. within such ranges as not to interfere the object of the present invention, depending on its various uses.

The present resin composition can be produced by ordinary melt kneaders. Melt kneaders include, for example, a kneader, a roll mill, an uniaxial extruder, a biaxial extruder, a multiaxial extruder, etc. The working temperature for melt kneading is preferably from about 180° to about 240° C. To maintain the quality and working surroundings, inert gas flushing or deaeration using a single stage venting or multi-stage venting is preferable.

The present molded articles can be made from the present resin composition by injection molding, hot runner injection molding, outsert molding, insert molding, hollow injection molding, injection molding using a high-temperature mold by high frequency induction heating, compression molding, inflation molding, blow molding and extrusion molding, or by cutting of extrusion molded articles, etc.

The present molded articles are suitable for use in the following applications:

Mechanical working components, typically gears, cams, sliders, levers, arms, clutches, felt clutches, idler gears, pulleys, rollers, rolls, key stems, key tops, shutters, reels, shafts, joints, axles, bearings, guides, etc.;

Outsert molding resin components and insert molding resin components;

Components for office automation appliances, typically chassis, trays, side plates, printers and copiers;

Components for cameras and video appliances, typically VTR (video tape recorder), video movies, digital video cameras, cameras and digital cameras;

Components for music, image and information appliances, typically cassette players, DAT, LD (Laser Disk), MD (Mini Disk), CD (compact Disk) [including CD-ROM (Read Only Memory), CD-R (Recordable) and CD-RW (Rewritable)], DVD (Digital Versatile Disk) [including DVD-ROM, DVD-R, DVD-RW, DVD-RAM (Random Access Memory) and DVD-Audio], other optical disk drives, MFD, MO, navigation systems and mobile personal computers, and for communication appliances, typically portable telephones and facsimiles;

Electrical appliance components and electronic appliance components;

Automobile components such as fuel-related components, typically gasoline tanks, fuel pump modules, valves, gasoline tank flanges, etc., door-related components, typically door locks, door handles, window regulators, speaker grills, etc., sheet belt-related components, typically sheet belt slip rings, press buttons, throughanchor, tang, etc., combination switch components and switch and clip components;

Mechanical pencil penpoints and mechanical working components for propelling or retracting mechanical pencil lead;

Sinks, drains and mechanical working components for moving a plug into or out of a drain;

Door lock components for vending machines and mechanical working components for commodity product delivery;

Cord stoppers, adjusters, and buttons for clothes;

Sprinkler nozzles and connection joints for sprinkler hoses;

Architectural components for step rails and flooring material supports; and

Industrial components, typically disposable cameras, toys, fasteners, chains, conveyors, buckles, sporting goods, vending machines, furniture, musical instruments and housing equipment.

As described above, the present composition has, as compared to the conventional compositions, considerably improved impact resistance as well as good antistatic properties, while maintaining the heat stability of polyoxymethylene resins. Thus, the present resin composition is particularly suitable for OA appliances, VTR appliances, music-image-information appliances, communication applicances, automobile interior and exterior furnishings and industrial sundries.

DESCRIPTION OF PREFERRED EMBODIMENTS

The present invention will be described in detail below, referring to Examples. First of all, materials used in the Examples and Comparative Examples, and evaluation methods will be explained.

<Details of Materials Used>

(A) Polyoxymethylene Resins a-1: Polyoxymethylene copolymer containing 1.3 mol. % of 1,3-dioxolane as a copolymer component and having a flexural modulus of elasticity: 2600 MPa and a melt index: 3.0 g/10 min. (ASTM D-1238-57T);

a-2: Polyoxymethylene copolymer containing 0.5 mol. % of 1,3-dioxolane as a copolymer component and having a flexural modulus of elasticity: 2900 MPa and a melt index: 3.0 g/10 min. (ASTM D-1238-57T);

a-3: Polyoxymethylene copolymer containing 2.5 mol. % of 1,3-dioxolane as a copolymer component and having a flexural modulus of elasticity: 2450 MPa and a melt index: 3.0 g/10 min. (ASTM D-1238-57T);

a-4: Polyoxymethylene copolymer obtained by the following procedure:

Trioxane containing 4 ppm of water and formic acid in total and 1,3-dioxolane (cyclic formal) were fed to a polymerizer simultaneously at 40 moles/hr and 1 mole/hr, respectively, and $1 \times 10^{-5}$ mole of trifluoroboron-di-n-butyletherate dissolved in cyclohexane as a polymerization catalyst and $1 \times 10^{-3}$ mole of hydrogenated polybutadiene hydroxylated at both terminals (Mn=2330), represented by the following formula (1) as a chain transfer agent were continuously fed thereto each on the basis of one mole of trioxane and subjected to polymerization;

Polymers discharged from the polymerizer were put into an aqueous 1% triethylamine solution to completely deactivate the polymerization catalyst, and then the polymers were recovered by filtration and washed. Then, 20 wt. ppm of triethyl (2-hydroxyethyl) ammonium formate as a quaternary ammonium compound in terms of nitrogen was added to one part by weight of the crude polyoxymethylene copolymer resulting from the filtration and washing, followed by uniform mixing and drying at 120° C.

Then, 0.3 parts by weight of triethyleneglycol-bis-[3-(3-t-butyl-5-methyl-4-hydroxyphenyl)-propionate] as an antioxidant was added to 100 parts by weight of the dried crude polyoxymethylene copolymer, and the mixture was fed to a biaxial screw extruder with a vent. While adding water and/or triethylamine to the molten oxymethylene copolymer in the extruder, if required, decomposition of unstable terminals was carried out at an extruder temperature set to 200° C. for a residence time of 5 minutes. The polyoxymethylene copolymer decomposed at the unstable terminals was deaerated under reduced pressure of −600 mmHg and extruded through the extruder dies as strands and pelletized by a cutter. The resulting polyoxymethylene copolymer was found to have a melt index: 3.5 g/10 min. (ASTM D-1238-57T);

a-5: Polyoxymethylene copolymer containing 0.5 mol. % of 1,3-dioxolane as a copolymer component and having a flexural modulus of elasticity: 2900 MPa and a melt index: 9.0 g/10 min. (ASTM D-1238-57T).

(B) Polyamide Elastomer b-1: 105 parts by weight of c-caprolactam, 17.1 parts by weight of adipic acid, 0.3 parts by weight of antioxidant (Irganox 1010, made by Ciba Speciality Chemicals Co., Ltd.) and 6 parts by weight of water were charged into a 3-liter stainless steel autoclave, followed by nitrogen flushing and heating at 220° C. for 4 hours with stirring upon tight sealing under pressure, thereby obtaining 117 parts by weight of polyamide oligomer with carboxyl groups at both terminals. Then, 225 parts by weight of bisphenol A ethylene oxide adduct having a number average molecular weight of 2,000 and 0.5 parts by weight of zirconyl acetate were added thereto to conduct polymerization at 245° C. for 5 hours under reduced pressure of 1 mmHg or less, whereby viscous polymer was obtained. The polymer was placed in a strand shape onto a belt and pelletized to obtain polyether ester amide. The polyether ester amide so obtained had a relative viscosity of 2.2 (0.5 wt. %, m-cresol solution, 25° C.) and the following copolymer composition based on NMR determination;

| | |
|---|---|
| Caprolactam residue: | 28.3 parts by weight |
| Bisphenol A ethylene oxide adduct residue: | 67.2 parts by weight |
| Adipic acid residue: | 4.5 parts by weight | b-2: 500 parts by weight of caprolactam, 450 parts by weight of polyethylene glycol, 66 parts by weight of adipic acid and 5 parts by weight of antioxidant (Irganox 1098, made by Ciba Specialty chemicals Co., Ltd.) were charged into a 3-liter stainless steel autoclave, followed by heating at 260° C. for one hour with stirring in a nitrogen atmosphere to obtain a homogeneous transparent solution. Then, 1.0 parts by weight of an antimony trioxide catalyst was added thereto. Then, the pressure was reduced to 1 mmHg or less over one hour, and then reaction was carried out for 3 hours. The resulting viscous polymer was placed in a strand shape onto a belt and pelletized to obtain polyether ester amide. The polyether ester amide so obtained had a relative viscosity of 2.0 (0.5 wt. %, m-cresol solution, 25° C.) and had the following copolymer composition based on NMR determination;

| Caprolactam residue: | 50.0 parts by weight |
|---|---|
| Polyethylene glycol residue: | 44.2 parts by weight |
| Adipic acid residue: | 5.8 parts by weight | b-3: Polyether ester amide block copolymer composed of about 50 wt. % of polyamide 12 and about 50 wt. % of poly(tetramethylene oxide) (Diamido E40, made by Daicel-Huels Co., Ltd.);

b-4: Polyether ester amide block copolymer composed of about 60 wt. % of polyamide 12 and about 40 wt. % of poly(tetramethylene oxide) (Diamido E47, made by Daicel-Huels Co., Ltd.);

b-5: 50 parts by weight of caprolactam and 50 parts by weight in total of polypropylene glycol diamine having a number average molecular weight of 2,000 and a substantially equivalent weight of dimer acid corresponding thereto were charged into an autoclave, followed by nitrogen flushing, heating at 240° C. for 3 hours, then temperature elevation to 270° C. over one hour and further heating at 270° C. for 3 hours to complete polycondensation. The resulting viscous polymer was placed in a strand shape onto a belt and pelletized to obtain polyether amide. The polyether amide so obtained had a relative viscosity of 1.8 (0.5 wt. %, m-cresol solution, 25° C.) and had the following copolymer composition based on NMR determination;

| Caprolactam residue: | 51.0 parts by weight |
|---|---|
| Polyethylene glycol residue: | 49.0 parts by weight | b-6: Miractolane P22M (polyurethane resin, made by Nihon Polyurethane K.K.).

(C) Acid-Modified Olefinic Resin c-1: Maleic acid-modified straight chain, low density polyethylene having a maleic acid modification rate of 0.5 wt. % and a melt index of 2.5 g/10 min. (ASTM D-1238-57T);

c-2: Maleic acid-modified straight chain, low density polyethylene having a maleic acid modification rate of 1.0 wt. % and a melt index of 3.0 g/10 min. (ASTM D-1238-57T);

c-3 Maleic acid-modified straight chain, low density polyethylene having a maleic acid modification rate of 1.5 wt. % and a melt index of 3.0 g/10 min. (ASTM D-1238-57T);

c-4: Maleic acid-modified ethylene-butene copolymer having a maleic acid modification rate of 1.5 wt. % and a melt index of 5.0 g/10 min. (ASTM D-1238-57T);

c-5 Maleic acid-modified, hydrogenated styrene-butadiene block copolymer having a maleic acid modification rate of 1.0 wt. % and a melt index of 0.4 g/10 min. (ASTM D-1238-57T), obtained by modifying Tuftec H 1052 of styrene/butadiene=20/80 wt. % (made by Asahi Kasei Co.) with maleic anhydride;

c-6: Straight chain, low density polyethylene having a melt index of 2.5 g/10 min. (ASTM D-1238-57T);

c-7: Maleic acid-modified straight chain, low density polyethylene having a maleic acid modification rate of 0.05 wt. % and a melt index of 2.5 g/10 min. (ASTM D-1238-57T);

c-8: Maleic acid-modified straight chain, low density polyethylene having a maleic acid modification rate of 0.1 wt. % and a melt index of 2.5 g/10 min. (ASTM D-1238-57T);

c-9: Maleic acid-modified straight chain, low density polyethylene having a maleic acid modification rate of 3.0 wt. % and a melt index of 3.2 g/10 min. (ASTM D-1238-57T);

c-10: Maleic acid-modified straight chain, low density polyethylene having a maleic acid modification rate of 4.0 wt. % and a melt index of 3.7 g/10 min. (ASTM D-1238-57T);

c-11: Maleic acid-modified straight chain, low density polyethylene having a maleic acid modification rate of 5.0 wt. % and a melt index of 4.0 g/10 min. (ASTM D-1238-57T).

(D) Lubricant d-1: Cetyl myristate ester;

d-2: Polyethylene glycol (molecular weight: 2,000);

d-3: Polydimethylsiloxane having an average polymerization degree of 5,000.

(E) Inorganic Filler e-1: Granular wollastonite having a volume average particle size of 3 μm, measured by a laser particle size meter and an aspect ratio of 3;

e-2: Ketjenblack EC (electroconductive carbon black made by Lion-Aquezo K.K.).

[Evaluation Method]

(1) Shape of Dispersed Phase and Particle Size

Moldings used in the physical property determination of the following section (4) were cut at the center at a right angle to the flow direction to prepare test pieces. Shapes of dispersed phase in the test pieces were inspected by a transmission electron microscope and particle sizes were determined at the same time. Inspected shapes of dispersed phase were classified into the following 3 groups:

I: Spherical shape

II: Overlapped spherical shape

III: Bar-like shape (2) Heat Stability

Pellets obtained in the following Examples and Comparative Examples were dried at 100° C. for 3 hours, then made to reside in a 1-ounce molding machine set to a cylinder temperature of 215° C. (TI-30G, made by Toyo Machinery and Metal Co., Ltd.), and then molded into 3 mm-thick flat plates under such conditions as mold temperature: 70° C. and cooling time: 15 seconds, to measure the residence time until silver appeared on the molding surface.

(3) Volume Resistivity

Pellets obtained in the following Examples and Comparative Examples were dried at 80° C. for 3 hours, and then molded into flat plates, 130×110×3 mm, by a 5-ounce molding machine (IS-100E, made by Toshiba Machine Co., Ltd.) set to a cylinder temperature of 200° C. under such conditions as mold temperature: 70° C. and cooling time: 30 seconds. The flat plates were left in a thermostat chamer at a temperature of 23° C. and a humidity of 50% for 48 hours and then subjected to determination according to JIS K6911.

(4) Physical Property Evaluation

Pellets obtained in the following Examples and Comparative Examples were dried at 80° C. for 3 hours, and then molded into test pieces for physical property evaluation by a 5-ounce molding machine (IS-100E, made by Toshiba Machine Co., Ltd.) set to a cylinder temperature of 200° C. under such conditions as mold temperature: 70° C. and cooling time: 30 seconds. The test pieces were subjected to the following tests:

Tensile strength and tensile elongation: measured on the basis of ASTM D638.

Bending strength and flexural modulus of elasticity:

measured on the basis of ASTM D790.

Izod impact strength; measured on the basis of ASTM D256 (at 23° C. and −50° C.).

Peeling at gate part: Occurrence of peeling at the gate part of a dumbell for tensile test was observed.

Tensile elongation at weld part: Test pieces were molded by a mold with gates at both ends and tensile elongation was measured according to ASTM D 638.

(5) Slidability

Pellets obtained in the following Examples and Comparative Examples were dried at 80° C. for 3 hours and then molded into 3 mm-thick flat plates as test pieces by a 1-ounce molding machine (TI-30G, made by Toyo Machinery & Metal Co., Ltd.) set to a cylinder temperature of 200° C. under such conditions as mold temperature: 70° C. and cooling time: 20 seconds. The test pieces were subjected to a reciprocation test of 5,000 runs using a reciprocating friction-wear tester (Model AFT-15MS, made by Toyo Seimitsu K.K.) under such conditions as load: 2 kg, linear velocity: 30 mm/sec, reciprocating distance: 20 mm and surrounding temperatures: 23° C. and 80° C., to determine a coefficient of friction and a wear rate. SUS 304 test pieces (balls, 5 mm in diameter) and polyoxymethylene resin test pieces (cylinders, 5 mm in diameter, with a tip end at R=2.5 mm, molded from Tenac-C 4520, made by Asahi Kasei Co.) were used as counter members for evaluating the slidability of the test pieces.

EXAMPLE 1

95 parts by weight of polyoxymethylene resin (a-1) containing 0.3 wt. % of triethylene glycol-bis-[3 -(3-t-butyl-5-methyl-4-hydroxyphenyl)propionate], 0.05 wt. % of polyamide 66 and 0.10 wt. % of calcium stearate as stabilizers, 2.5 parts by weight of polyamide elastomer (b-1) and 2.5 parts by weight of acid-modified olefinic resin (c-3) were uniformly blended in a blender and melt kneaded by a biaxial extruder, 30 mm in diameter (L/D=30) set to 200° C. at a screw revolution rate of 200 rpm and at a feed rate of 10 kg/hr. The extruded resin was pelletized by a strand cutter. The above-mentioned properties of pellets were evaluated. Results are shown in Table 1.

EXAMPLES 2 to 7

Pellets of resin compositions shown in Table 1 were prepared in the same manner as in Example 1, and the above-mentioned properties were evaluated. Results are shown in Table 1.

TABLE 1

| | | | | Ex. 1 | Ex. 2 | Ex. 3 | Ex. 4 | Ex. 5 | Ex. 6 | Ex. 7 |
|---|---|---|---|---|---|---|---|---|---|---|
| Composition | (A) Polyoxymethylene resin | | (a-1) | 95 | 75 | 70 | 65 | 60 | 65 | 65 |
| | (B) Polyamide elastomer | | (b-1) | 2.5 | 12.5 | 15 | 17.5 | 20 | 17.5 | 17.5 |
| | (C) Acid-modified olefinic polymer | | (c-1) | | | | | | 17.5 | |
| | | | (c-2) | | | | | | | 17.5 |
| | | | (c-3) | 2.5 | 12.5 | 15 | 17.5 | 20 | | |
| Results | Dispersed phase | Shape | | I | I | I~II | I~II | I~II | I~II | I~II |
| | | Particle size ($\mu$m) | | 0.1~3 | 0.1~3 | 0.1~3 | 0.1~4 | 0.1~4 | 0.1~5 | 0.1~3 |
| | Heat stability (min) | | | 45 | 30 | 25 | 25 | 20 | 30 | 25 |
| | Volume resistivity ($\Omega \cdot$ cm) | | | $2 \times 10^{13}$ | $7 \times 10^{12}$ | $3 \times 10^{12}$ | $2 \times 10^{12}$ | $2 \times 10^{12}$ | $3 \times 10^{12}$ | $3 \times 10^{12}$ |
| | Peeling at gate part | | | none | none | none | none | none | none | none |
| | Mechanical | Tensile strength (MPa) | | 54 | 43 | 35 | 30 | 26 | 32 | 31 |
| | properties | Tensile elongation (%) | | 80 | 120 | 160 | 190 | 250 | 140 | 160 |
| | | Bending strength (MPa) | | 78 | 50 | 43 | 35 | 30 | 37 | 36 |
| | | Flexual modulus (MPa) | | 2100 | 1130 | 870 | 530 | 350 | 640 | 610 |
| | | Izod impact strength (J/m) | 23° C. | 100 | 260 | 660 | 950 | 960 | 350 | 910 |
| | | | −50° C. | 60 | 90 | 140 | 250 | 340 | 80 | 200 |
| | | Elongation at weld part (%) | | 30 | 10 | 7 | 5 | 3 | 4 | 5 |
| | Slidability | 23° C. | Coefficient of friction ($\mu$) | 0.35 | 0.39 | 0.42 | 0.46 | 0.50 | 0.45 | 0.46 |
| | (Polyoxymethylene resin as counter member) | 5000 runs | Wear rate ($\mu$m) | 61 | 220 | 280 | 340 | 430 | 320 | 340 |
| | | 80° C. | Coefficient of friction ($\mu$) | 0.16 | 0.16 | 0.17 | 0.18 | 0.20 | 0.16 | 0.17 |
| | | 5000 runs | Wear rate ($\mu$m) | 35 | 110 | 140 | 160 | 190 | 150 | 160 |

COMPARATIVE EXAMPLE

Pellets of resin composition were prepared in the same manner as in Example 1 except that the amount of (a-1) was changed to 100 parts by weight and neither (b-1) nor (c-3) were used, and the above-mentioned properties were evaluated. Results are shown in Table 2.

COMPARATIVE EXAMPLES 2 to 5

Pellets of resin compositions were prepared in the same manner as in Example 1 except that no (c-3) was added but the amount of (b-1) was changed, and the above-mentioned properties were evaluated. Results are shown in Table 2.

COMPARATIVE EXAMPLES 6 to 9

Pellets of resin compositions were prepared in the same manner as in Comparative Examples 2 to 5, except that (b-1)

was changed to (b-6) polyurethane, and the above-mentioned properties were evaluated. Results are shown in Table 2.

of (c-1). The resin was decomposed and foamed during the extrusion and the physical properties could not be evaluated.

TABLE 2

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| Composition | (A) Polyoxymethylene resin | (a-1) | 100 | 95 | 75 | 65 | 60 | 95 | 75 | 65 | 60 |
| | (B) Polyamide elastomer | (b-1) | | 5 | 25 | 35 | 40 | | | | |
| | | (b-6) | | | | | | 5 | 25 | 35 | 40 |
| | (C) Acid-modified olefinic polymer | | | | | | | | | | |
| Results | Dispersed phase Shape | | | I~II | I~II | III | III | I | I | I | I |
| | Particle size ($\mu$m) | | | 0.1~3 | 0.1~5 | 25 | 40 | 0.05~2 | 0.05~2 | 0.05~1 | 0.05~1 |
| | Heat stability (min) | | 50 | 40 | 30 | 30 | 25 | 40 | 25 | 25 | 20 |
| | Volume resistivity ($\Omega \cdot$ cm) | | $7 \times 10^{14}$ | $2 \times 10^{13}$ | $4 \times 10^{12}$ | $2 \times 10^{12}$ | $2 \times 10^{12}$ | $6 \times 10^{14}$ | $2 \times 10^{14}$ | $1 \times 10^{14}$ | $1 \times 10^{14}$ |
| | Peeling at gate part | | none | none | none | none | none | none | none | none | none |
| Mechanical properties | Tensile strength (MPa) | | 60 | 54 | 41 | 36 | 34 | 53 | 42 | 36 | 29 |
| | Tensile elongation (%) | | 50 | 80 | 110 | 110 | 120 | 70 | 100 | 140 | 160 |
| | Bending strength (MPa) | | 89 | 78 | 49 | 42 | 38 | 77 | 49 | 35 | 30 |
| | Flexural modulus (MPa) | | 2600 | 2100 | 1100 | 830 | 500 | 2000 | 1100 | 490 | 340 |
| | Izod impact strength (J/m) | 23° C. | 60 | 90 | 180 | 240 | 270 | 95 | 250 | 920 | 930 |
| | | −50° C. | 40 | 40 | 40 | 45 | 50 | 40 | 70 | 130 | 21 |
| | Elongation at weld part (%) | | 35 | 21 | 10 | 7 | 5 | 5 | 3 | 1 | <1 |
| Slidability (Polyoxymethylene resin as counter member) | 23° C. 5000 runs | Coefficient of friction ($\mu$) | 0.57 | 0.39 | 0.45 | 0.51 | 0.55 | 0.58 | 0.81 | 0.83 | 0.90 |
| | | Wear rate ($\mu$m) | 120 | 190 | 310 | 350 | 400 | 320 | 470 | 510 | 570 |
| | 80° C. 5000 runs | Coefficient of friction ($\mu$) | 0.46 | 0.19 | 0.25 | 0.31 | 0.34 | 0.60 | 0.85 | 0.95 | 1.05 |
| | | Wear rate ($\mu$m) | 95 | 170 | 240 | 270 | 310 | 480 | 640 | 850 | 1050 |

COMPARATIVE EXAMPLE 10

75 parts by weight of polyoxymethylene resin (a-1) containing 0.3 wt. % of triethylene glycol-bis-[3-(3-t-butyl-5-methyl-4-hydroxyphenyl)propionate], 0.05 wt. % of polyamide 66 and 0.10 wt. % of calcium stearate as stabilizers, and 25 parts by weight of acid-modified olefinic resin (c-1) were uniformly blended in a blender and then melt kneaded by a biaxial extruder, 30 mm in diameter, (L/D=30) set to 200° C. at a screw revolution rate of 200 rpm and a feed rate of 10 kg/hr. The extruded resin was pelletized by a strand cutter. The above-mentioned properties of the pellets were evaluated. Results are shown in Table 3.

COMPARATIVE EXAMPLE 11

Pellets of resin composition were prepared in the same manner as in Comparative Example 10 except that (c-2) was used in place of (c-1), and the above mentioned properties were evaluated. Results are shown in Table 3.

COMPARATIVE EXAMPLE 12

Melt extrusion was carried out in the same manner as in Comparative Example 10 except that (c-3) was used in place of (c-1). The resin was decomposed and foamed during the extrusion and the physical properties could not be evaluated.

COMPARATIVE EXAMPLE 13

65 parts by weight of polyoxymethylene resin (a-1) containing 0.3 wt. % of triethylene glycol-bis-[3-(3-t-butyl-5-methyl-4-hydroxyphenyl)propionate], 0.05 wt. % of polyamide 66 and 0.10 wt. % of calcium sterate as stabilizers, and 35 parts by weight of acid-modified olefinic resin (c-3) were uniformly blended in a blender and then melt-kneaded by a biaxial extruder, 30 mm in diameter (L/D=30) set to 200° C. at a screw revolution rate of 200 rpm and a feed rate of 10 kg/hr. The resin was decomposed and foamed during the extrusion and the physical properties could not be evaluated.

COMPARATIVE EXAMPLE 14

Melt extrusion was carried out in the same manner as in Comparative Example 13, except (c-3) was used in place of (c-2). The resin was decomposed and foamed during the extrusion and the physical properties could not be evaluated.

TABLE 3

| | | | | Comp. Ex. 10 | Comp. Ex. 11 | Comp. Ex. 12 | Comp. Ex. 13 | Comp. Ex. 14 |
|---|---|---|---|---|---|---|---|---|
| Composition | (A) Polyoxymethylene resin | | (a-1) | 75 | 75 | 75 | 65 | 65 |
| | (B) Polyamide elastomer | | | | | | | |
| | (C) Acid-modified olefinic polymer | | (c-1) | 25 | | | | |
| | | | (c-2) | | 25 | | 35 | |
| | | | (c-3) | | | 25 | | 35 |
| Results | Dispersed phase | Shape | | I~III | I~III | Decomposition | → | → |
| | | Particle size ($\mu$m) | | 10 | 10 | | | |
| | Heat stability (min) | | | 5 | 3 | | | |

TABLE 3-continued

|  |  |  |  | Comp. Ex. 10 | Comp. Ex. 11 | Comp. Ex. 12 | Comp. Ex. 13 | Comp. Ex. 14 |
|---|---|---|---|---|---|---|---|---|
| Volume resistivity (Ω · cm) |  |  |  | $8 \times 10^{14}$ | $7 \times 10^{14}$ | and foaming during extrusion |  |  |
| Peeling at gate part |  |  |  | occurred | occurred |  |  |  |
| Mechanical properties | Tensile strength (MPa) |  |  | 40 | 39 |  |  |  |
|  | Tensile elongation (%) |  |  | 45 | 50 |  |  |  |
|  | Bending strength (MPa) |  |  | 45 | 43 |  |  |  |
|  | Flexual modulus (MPa) |  |  | 1050 | 1030 |  |  |  |
|  | Izod impact strength (J/m) | 23° C. |  | 85 | 90 |  |  |  |
|  |  | −50° C. |  | 30 | 35 |  |  |  |
|  | Elongation at weld part (%) |  |  | 3 | 3 |  |  |  |
| Slidability (Polyoxymethylene resin as counter member) | 23° C. 5000 runs | Coefficient of friction (μ) |  | Determination was impossible due to increased wear by peeling | → |  |  |  |
|  |  | Wear rate (μm) |  |  |  |  |  |  |
|  | 80° C. 5000 runs | Coefficient of friction (μ) |  | Determination was impossible due to increased wear by peeling | → |  |  |  |
|  |  | Wear rate (μm) |  |  |  |  |  |  |

EXAMPLE 8

65 parts by weight of polyoxymethylene resin (a-2) containing 0.3 wt. % of triethylene glycol-bis-[3-(3-t-butyl-5-methyl-4-hydroxyphenyl)propionate], 0.05 wt. % of polyamide 66 and 0.10 wt. % of calcium stearate as stabilizers, 17.5 parts by weight of polyamide elastomer (b-1) and 17.5 parts by weight of acid-modified olefinic resin (c-3) were uniformly blended in a blender and melt kneaded by a biaxial extruder, 30 mm in diameter (L/D=30), set to 200° C. at a screw revolution rate of 200 rpm and a feed rate of 10 kg/hr. The extruded resin was pelletized by a strand cutter. The pellets so obtained were subjected to evaluation of the above-mentioned properties. Results are shown in Table 4.

EXAMPLES 9 to 16

Pellets of resin compositions shown in Table 4 were prepared in the same manner as in Example 8 and subjected to evaluation of the above-mentioned properties. Results are shown in Table 4.

TABLE 4

|  |  |  |  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|
| Composition | (A) Polyoxymethylene resin | (a-1) |  |  |  |  | 65 | 65 |  |  |  |  |
|  |  | (a-2) |  | 65 |  |  |  |  |  |  |  |  |
|  |  | (a-3) |  |  | 65 |  |  |  | 65 | 65 | 65 | 65 |
|  |  | (a-4) |  |  |  | 65 |  |  |  |  |  |  |
|  | (B) Polyamide elastomer | (b-1) |  | 17.5 | 17.5 | 17.5 | 17.5 | 17.5 |  |  |  |  |
|  |  | (b-2) |  |  |  |  |  |  | 17.5 |  |  |  |
|  |  | (b-3) |  |  |  |  |  |  |  | 17.5 |  |  |
|  |  | (b-4) |  |  |  |  |  |  |  |  | 17.5 |  |
|  |  | (b-5) |  |  |  |  |  |  |  |  |  | 17.5 |
|  | (C) Acid-modified olefinic polymer | (c-3) |  | 17.5 | 17.5 | 17.5 |  |  | 17.5 | 17.5 | 17.5 | 17.5 |
|  |  | (c-4) |  |  |  |  | 17.5 |  |  |  |  |  |
|  |  | (c-5) |  |  |  |  |  | 17.5 |  |  |  |  |
| Results | Dispersed phase | Shape |  | I~II | I~II | I~II | I~II | I~II | I~II | I~II | I~II | I~II |
|  |  | Particle size (μm) |  | 0.1~4 | 0.1~3 | 0.1~4 | 0.1~4 | 0.1~4 | 0.1~3 | 0.1~4 | 0.1~4 | 0.1~3 |
|  | Heat stability (min) |  |  | 20 | 35 | 25 | 25 | 25 | 35 | 25 | 25 | 25 |
|  | Volume resistivity (Ω · cm) |  |  | $3 \times 10^{12}$ | $3 \times 10^{12}$ | $2 \times 10^{12}$ | $3 \times 10^{12}$ | $3 \times 10^{12}$ | $3 \times 10^{12}$ | $3 \times 10^{12}$ | $3 \times 10^{12}$ | $3 \times 10^{12}$ |
|  | Peeling at gate part |  |  | none | none | none | none | none | none | none | none | none |
|  | Mechanical properties | Tensile strength (MPa) |  | 32 | 28 | 29 | 32 | 25 | 28 | 32 | 32 | 29 |
|  |  | Tensile elongation (%) |  | 160 | 160 | 190 | 130 | 100 | 160 | 140 | 120 | 150 |
|  |  | Bending strength (MPa) |  | 38 | 34 | 35 | 38 | 38 | 35 | 36 | 38 | 34 |
|  |  | Flexual modulus (MPa) |  | 640 | 480 | 530 | 650 | 680 | 480 | 660 | 680 | 480 |
|  |  | Izod impact strength (J/m) | 23° C. | 860 | 950 | 920 | 790 | 380 | 760 | 740 | 700 | 930 |
|  |  |  | −50° C. | 130 | 290 | 280 | 185 | 110 | 190 | 150 | 120 | 210 |
|  |  | Elongation at weld part (%) |  | 7 | 7 | 9 | 7 | 10 | 7 | 7 | 7 | 7 |
|  | Slidability (Polyoxymethylene resin as counter member) | 23° C. 5000 runs | Coefficient of friction (μ) | 0.41 | 0.48 | 0.46 | 0.42 | 0.52 | 0.41 | 0.51 | 0.52 | 0.41 |
|  |  |  | Wear rate (μm) | 250 | 380 | 320 | 270 | 420 | 230 | 400 | 410 | 270 |
|  |  | 80° C. 5000 runs | Coefficient of friction (μ) | 0.16 | 0.20 | 0.19 | 0.16 | 0.22 | 0.15 | 0.21 | 0.20 | 0.16 |
|  |  |  | Wear rate (μm) | 140 | 190 | 180 | 140 | 210 | 130 | 190 | 190 | 150 |

EXAMPLES 17 and 18

Pellets of resin compositions shown in Table 5 were prepared in the same manner as in Example 4 and subjected to evaluation of the above-mentioned properties. Results are shown in Table 5.

COMPARATIVE EXAMPLES 15 and 16

Pellets of resin compositions were prepared in the same manner as in Example 17, except that the amounts of (b-1) and (c-3) were changed, and subjected to evaluation of the above-mentioned properties. Results are shown in Table 5. In Comparative Example 16, decomposition and foaming took place during the extrusion and evaluation of the physical properties could not be made.

200° C. at a screw revolution rate of 200 rpm and a feed rate of 10 kg/hr. The extruded resin was pelletized by a strand cutter and the pellets so obtained were subjected to evaluation of the above-mentioned properties. Results are shown in Table 6.

EXAMPLES 20 to 25

Pellets of resin compositions shown in Table 6 were prepared in the same manner as in Example 19 and subjected to evaluation of the above-mentioned properties. Results are shown in Table 6.

TABLE 5

|  |  |  |  | Ex. 17 | Ex. 18 | Comp. Ex. 15 | Comp. Ex. 16 |
|---|---|---|---|---|---|---|---|
| Composition | (A) Polyoxymethylene resin | | (a-1) | 65 | 65 | 65 | 65 |
| | (B) Polyamide elastomer | | (b-1) | 10 | 25 | 32 | 3 |
| | (C) Acid-modified olefinic polymer | | (c-3) | 25 | 10 | 3 | 32 |
| Results | Dispersed phase | Shape | | I~II | I~II | III | Decomposition and foaming during extrusion |
| | | Particle size (μm) | | 0.1~5 | 0.1~3 | 20 | |
| | Heat stability (min) | | | 20 | 30 | 25 | |
| | Volume resistivity (Ω · cm) | | | $9 \times 10^{12}$ | $2 \times 10^{12}$ | $2 \times 10^{12}$ | |
| | Peeling at gate part | | | none | none | none | |
| | Mechanical properties | Tensile strength (MPa) | | 34 | 32 | 35 | |
| | | Tensile elongation (%) | | 150 | 120 | 110 | |
| | | Bending strength (MPa) | | 39 | 39 | 42 | |
| | | Flexual modulus (MPa) | | 700 | 720 | 830 | |
| | | Izod impact strength (J/m) | 23° C. | 360 | 440 | 250 | |
| | | | −50° C. | 170 | 130 | 50 | |
| | | Elongation at weld part (%) | | 7 | 10 | 7 | |
| | Slidability (Polyoxymethylene resin as counter member) | 23° C. 5000 runs | Coefficient of friction (μ) | 0.40 | 0.44 | 0.50 | |
| | | | Wear rate (μm) | 260 | 300 | 330 | |
| | | 80° C. 5000 runs | Coefficient of friction (μ) | 0.17 | 0.22 | 0.30 | |
| | | | Wear rate (μm) | 150 | 220 | 260 | |

EXAMPLE 19

65 parts by weight of polyoxymethylene resin (a-1) containing 0.3 wt. % of triethylene glycol-bis-[3-(3-t-butyl-5-methyl-4-hydroxyphenyl)propionate], 0.05 wt. % of polyamide 66 and 0.10 wt. % of calcium stearate as stabilizers, 10 parts by-weight of polyamide elastomer (b-1) and 25 parts by weight of acid-modified olefinic resin (c-7) were uniformly blended in a blender and then melt kneaded by a biaxial extruder, 30 mm in diameter (L/D=30), set to

COMPARATIVE EXAMPLE 17

Pellets of resin composition were prepared in the same manner as in Example 19 except that (c-6) was used in place of (c-7), and subjected to evaluation of the above-mentioned properties. Results are shown in Table 6.

TABLE 6

|  |  |  |  | Ex. 19 | Ex. 20 | Ex. 21 | Ex. 22 | Ex. 23 | Ex. 24 | Ex. 25 | Comp. Ex. 17 |
|---|---|---|---|---|---|---|---|---|---|---|---|
| Composition | (A) Polyoxymethylene resin | | (a-1) | 65 | 65 | 65 | 65 | 65 | 65 | 65 | 65 |
| | | | (a-2) | | | | | | | | |
| | (B) Polyamide elastomer | | (b-1) | 10 | 10 | 10 | 10 | 10 | 10 | 10 | 10 |
| | (C) Acid-modified olefinic polymer | | (c-1) | | | | 25 | | | | |
| | | | (c-2) | | | | | 25 | | | |
| | | | (c-6) | | | | | | | | 25 |
| | | | (c-7) | 25 | | | | | | | |
| | | | (c-8) | | 25 | | | | | | |
| | | | (c-9) | | | | | | 25 | | |
| | | | (c-10) | | | | | | | 25 | |
| | | | (c-11) | | | 25 | | | | | |
| Results | Dispersed phase | Shape | | I~II | I~II | I~II | I~II | I~II | I~II | I~II | III |
| | | Particle size (μm) | | 0.1~10 | 0.1~5 | 0.1~4 | 0.1~4 | 0.1~3 | 0.1~3 | 0.1~3 | 30 |
| | Heat stability (min) | | | 30 | 30 | 25 | 25 | 15 | 7 | 3 | 30 |
| | Volume resistivity (Ω · cm) | | | $1 \times 10^{13}$ | $9 \times 10^{12}$ | $9 \times 10^{12}$ | $8 \times 10^{12}$ | $7 \times 10^{12}$ | $6 \times 10^{12}$ | $5 \times 10^{12}$ | $1 \times 10^{13}$ |
| | Peeling at gate part | | | none | none | none | none | none | none | none | occurred |
| | Mechanical | Tensile strength (MPa) | | 33 | 33 | 35 | 34 | 34 | 33 | 33 | 30 |

TABLE 6-continued

|  |  |  |  | Ex. 19 | Ex. 20 | Ex. 21 | Ex. 22 | Ex. 23 | Ex. 24 | Ex. 25 | Comp. Ex. 17 |
|---|---|---|---|---|---|---|---|---|---|---|---|
|  | properties | Tensile elongation (%) |  | 80 | 100 | 120 | 140 | 190 | 160 | 130 | 50 |
|  |  | Bending strength (MPa) |  | 36 | 36 | 38 | 39 | 39 | 39 | 39 | 35 |
|  |  | Flexural modulus (MPa) |  | 670 | 680 | 680 | 700 | 700 | 700 | 700 | 660 |
|  |  | Izod impact strength | 23° C. | 180 | 200 | 250 | 360 | 390 | 370 | 280 | 100 |
|  |  | (J/m) | −50° C. | 65 | 90 | 120 | 170 | 180 | 170 | 130 | 45 |
|  |  | Elongation at weld part (%) |  | 5 | 6 | 7 | 7 | 7 | 7 | 7 | 1 |
| Slidability (Polyoxymethylene resin as counter member) | 23° C. 5000 runs | Coefficient of friction ($\mu$) |  | 0.41 | 0.40 | 0.41 | 0.40 | 0.41 | 0.40 | 0.39 | 0.40 |
|  |  | Wear rate ($\mu$m) |  | 350 | 300 | 260 | 260 | 230 | 220 | 210 | 550 |
|  | 80° C. 5000 runs | Coefficient of friction ($\mu$) |  | 0.18 | 0.18 | 0.18 | 0.18 | 0.17 | 0.16 | 0.16 | 0.17 |
|  |  | Wear rate ($\mu$m) |  | 240 | 180 | 130 | 140 | 120 | 120 | 120 | 300 |

EXAMPLE 26

96 parts by weight of polyoxymethylene resin (a-5) containing 0.3 wt. % of triethylene glycol-bis-[3-(3-t-butyl-5-methyl-4-hydroxyphenyl)propionate], 0.05 wt. % of polyamide 66 and 0.10 wt. % of calcium stearate as stabilizers, 2 parts by weight of polyamide elastomer (b-1) and 2 parts by weight of acid-modified olefinic resin (c-1) biaxial extruder, 30 mm in diameter (L/D=30), set to 200° C. at a screw revolution rate of 200 rpm and a feed rate of 10 kg/hr. The extruded resin was pelletized by a strand cutter, and subjected to evaluation of the above-mentioned properties. Results are shown in Table 7.

EXAMPLE 27

Pellets of resin composition were prepared in the same manner as in Example 26 except that one parts by weight of (d-1) component was further added thereto, and subjected to evaluation of the above-mentioned properties. Results are shown in Table 7.

EXAMPLE 28 and 29

Pellets of resin compositions were prepared in the same manner as in Example 27 except that the (d-1) component was changed, and subjected to evaluation of the above-mentioned properties. Results are shown in Table 7.

COMPARATIVE EXAMPLES 18 to 21

Pellets of resin compositions were prepared in the same manner as in Examples 26 to 29, except that the amount of (a-5) was changed to 100 parts by weight and neither (b-1) nor (c-1) was added, and subjected to evaluation of the above-mentioned properties. Results are shown in Table 7.

TABLE 7

|  |  |  |  | Ex. 26 | Ex. 27 | Ex. 28 | Ex. 29 | Comp Ex. 18 | Comp Ex. 19 | Comp Ex. 20 | Comp. Ex. 21 |
|---|---|---|---|---|---|---|---|---|---|---|---|
| Composition | (A) Polyoxymethylene resin |  | (a-5) | 96 | 96 | 96 | 96 | 100 | 100 | 100 | 100 |
|  | (B) Polyamide elastomer |  | (b-1) | 2 | 2 | 2 | 2 |  |  |  |  |
|  |  |  | (b-2) |  |  |  |  |  |  |  |  |
|  | (C) Acid-modified olefinic polymer |  | (c-1) | 2 | 2 | 2 | 2 |  |  |  |  |
|  | (D) Lubricant |  | (d-1) |  | 1 |  |  |  | 1 |  |  |
|  |  |  | (d-2) |  |  | 1 |  |  |  | 1 |  |
|  |  |  | (d-3) |  |  |  | 1.5 |  |  |  | 1.5 |
| Results | Dispersed phase | Shape |  | I~II | I~II | I~II | I~II |  |  |  |  |
|  |  | Particle size ($\mu$m) |  | 0.05~2 | 0.05~2 | 0.05~2 | 0.05~2 |  |  |  |  |
|  | Heat stability (min) |  |  | 40 | 40 | 40 | 40 | 45 | 35 | 35 | 40 |
|  | Volume resistivity ($\Omega \cdot$ cm) |  |  | $2 \times 10^{14}$ | $1 \times 10^{14}$ | $1 \times 10^{14}$ | $1 \times 10^{14}$ | $5 \times 10^{14}$ | $3 \times 10^{14}$ | $3 \times 10^{14}$ | $4 \times 10^{14}$ |
|  | Peeling at gate part |  |  | none | none | none | none | none | none | none | occurred |
|  | Mechanical properties | Tensile strength (MPa) |  | 55 | 53 | 53 | 52 | 61 | 59 | 58 | 55 |
|  |  | Tensile elongation (%) |  | 90 | 90 | 90 | 80 | 43 | 48 | 48 | 50 |
|  |  | Bending strength (MPa) |  | 80 | 78 | 78 | 79 | 91 | 85 | 85 | 80 |
|  |  | Flexural modulus (MPa) |  | 2500 | 2400 | 2400 | 2350 | 2800 | 2650 | 2650 | 2600 |
|  |  | Izod impact strength (J/m) 23° C. |  | 80 | 75 | 75 | 80 | 65 | 55 | 58 | 59 |
|  |  | Elongation at weld part (%) |  | 12 | 10 | 9 | 9 | 23 | 9 | 9 | 7 |
| Slidability (Polyoxymethylene resin as counter member) | 23° C. 5000 runs | Coefficient of friction ($\mu$) |  | 0.29 | 0.28 | 0.28 | 0.10 | 0.56 | 0.52 | 0.55 | 0.12 |
|  |  | Wear rate ($\mu$m) |  | 50 | 45 | 45 | 20 | 120 | 65 | 75 | 35 |
|  | 80° C. 5000 runs | Coefficient of friction ($\mu$) |  | 0.10 | 0.10 | 0.10 | 0.08 | 0.52 | 0.47 | 0.50 | 0.30 |
|  |  | Wear rate ($\mu$m) |  | 18 | 15 | 15 | 10 | 105 | 85 | 90 | 80 |
| Slidability (Stainless steel as counter member) | 23° C. 5000 runs | Coefficient of friction ($\mu$) |  | 0.24 | 0.15 | 0.16 | 0.12 | 0.24 | 0.15 | 0.20 | 0.19 |
|  |  | Wear rate ($\mu$m) |  | 10 | 5 | 7 | 10 | 10 | 10 | 15 | 50 |

EXAMPLE 30

96 parts by weight of polyoxymethylene resin (a-5) containing 0.3 wt. % of triethylene glycol-bis-[3-(3-t-butyl-5-methyl-4-hydroxyphenyl)propionate, 0.05 wt. % of polyamide 66 and 0.10 wt. % of calcium stearate as stabilizers, 2 parts by weight of polyamide elastomer (b-1), 2 parts by weight of acid-modified olefinic resin (c-1) and 25 parts by weight of inorganic filler (e-1) were uniformly blended in a blender, and then melt kneaded by a bioxial extruder, 30 mm in diameter (L/D=30), set to 200° C. at a screw revolution rate of 200 rpm and a feed rate of 8 kg/hr. The extruded resin was pelletized by a strand cutter. The pellets so obtained were subjected to evaluation of the above-mentioned properties. Results are shown in Table 8.

EXAMPLE 31

Pellets of resin composition were prepared in the same manner as in Example 30 except that 1.5 parts by weight of (d-1) component was further added thereto, and subjected to evaluation of the above-mentioned properties. Results are shown in Table 8.

COMPARATIVE EXAMPLES 22 and 23

Pellets of resin compositions were prepared in the same manner as in Examples 30 and 31 except that the amount of (a-5) was changed to 100 parts and neither (b-1) nor (c-1) was added thereto, and subjected to evaluation of the above-mentioned properties. Results are sown in Table 8.

EXAMPLE 32

95 parts by weight of polyoxymethylene resin (a-5) containing 0.3 wt. % of triethylene glycol-bis-[3-(3-t-butyl-5-methyl-4-hydroxyphenyl)propionate] and 0.05 wt. % of polyamide 66 as stabilizers, 2.5 parts by weight of polyamide elastomer (b-1), 2.5 parts by weight of acid-modified olefinic resin (c-1), 7 parts by weight of electroconductive carbon black (e-2), and one part by weight of triphenylphosphine, 2 parts by weight of epoxy resin (ARALDITE ECN 1299 made by Asahi Kasei Epoxy K.K.) and 0.3 parts by weight of dicyandiamide as stabilizers were uniformly blended in a blender and melt kneaded by a biaxial extruder, 30 nun in diameter (L/D=30), set to 200° C. at a screw revolution rate of 200 ppm and a feed rate of 10 kg/hr. The extruded resin was pelletized by a strand cutter. The pellets so obtained were subjected to evaluation of the above-mentioned properties. Results are shown in Table 8.

COMPARATIVE EXAMPLE 24

Pellets of resin composition were prepared in the same manner as in Example 32 except that the amount of (a-5) was changed to 100 parts by weight and neither (b-1) nor (c-1) was added thereto, and subjected to evaluation of the above-mentioned properties. Results are shown in Table 8.

TABLE 8

| | | | | Ex. 30 | Ex. 31 | Comp. Ex. 22 | Comp Ex. 23 | Ex. 32 | Comp Ex. 24 |
|---|---|---|---|---|---|---|---|---|---|
| Composition | (A) Polyoxymethylene resin | | (a-5) | 96 | 96 | 100 | 100 | 95 | 100 |
| | (B) Polyamide elastomer | | (b-1) | 2 | 2 | | | 2.5 | 5 |
| | (C) Acid-modified olefinic polymer | | (c-1) | 2 | 2 | | | 2.5 | |
| | (D) Lubricant | | (d-1) | | 1.5 | | 1.5 | | |
| | (E) Filler | | (e-1) | 25 | 25 | 25 | 25 | | |
| | | | (e-2) | | | | | 7 | 7 |
| Results | Dispersed phase | Shape | | I | I | | | I | |
| | | Particle size (μm) | | 0.05~2 | 0.05~2 | | | 0.05~2 | |
| | Heat stability (min) | | | 25 | 25 | 20 | 20 | 20 | 10 |
| | Volume resistivity (Ω · cm) | | | $7 \times 10^{13}$ | $5 \times 10^{13}$ | $2 \times 10^{14}$ | $1 \times 10^{14}$ | $5 \times 10^{1}$ | $5 \times 10^{1}$ |
| | Peeling at gate part | | | none | none | none | none | none | none |
| | Mechanical properties | Tensile strength (MPa) | | 50 | 48 | 54 | 50 | 44 | 47 |
| | | Tensile elongation (%) | | 12 | 12 | 5 | 5 | 20 | 15 |
| | | Bending strength (MPa) | | 87 | 86 | 90 | 88 | 76 | 83 |
| | | Flexual modulus (MPa) | | 3400 | 3300 | 3700 | 3500 | 2230 | 2620 |
| | | Izod impact strength (J/m) 23° C. | | 44 | 42 | 33 | 34 | 55 | 36 |
| | | Elongation at weld part (%) | | 3 | 3 | <1 | <1 | 13 | 10 |
| | Slidability (Polyoxymethylene resin as counter member) | 23° C. 5000 runs | Coefficient of friction (μ) | 0.27 | 0.25 | 0.71 | 0.70 | 0.27 | 0.59 |
| | | | Wear rate (μm) | 43 | 35 | 340 | 310 | 65 | 270 |
| | Slidability (Stainless steel as counter member) | 23° C. 5000 runs | Coefficient of friction (μ) | 0.20 | 0.15 | 0.678 | 0.17 | 0.22 | 0.55 |
| | | | Wear rate (μm) | 25 | 6 | 230 | 12 | 35 | 150. |

What is claimed is:

1. A polyoxymethylene resin composition, which comprises a continuous phase of a polyoxymethylene resin (A), in which is dispersed a polyether ester amide elastomer (B) and an acid-modified olefinic resin (C) having an acid modification rate of 0.05 to 15% by weight, wherein an amount of the component (A) is 40 to 99.5 parts by weight per 100 parts by weight of the composition, the weight total of the component (B) and the component (C) is 0.5 to 60 parts by weight per 100 parts by weight of the composition, a ratio of the component (B) to the component (C) is in a range of 10/90 to 90/10% by weight, and the proportion of acid groups in component (C) to amide groups in component (B) is in a range of 0.1–50 moles of the acid groups to 100 moles of the amide groups.

2. A polyoxymethylene resin composition according to claim 1, wherein the component (A) is in a continuous phase, and the component (B) and the component (C) are in a dispersed phase of spherical or overlapped spherical particle shapes, the particle size of the dispersed phase being 0.01 to 20 µm.

3. A polyoxymethylene resin composition according to claim 1, further comprising 0.1 to 10 parts by weight of a lubricant (D) and/or 0.1 to 150 parts by weight of an inorganic filler (E) per 100 parts by weight of the composition.

4. A polyoxymethylene resin composition according to claim 2, further comprising 0.1 to 10 parts by weight of a lubricant (D) and/or 0.1 to 150 parts by weight of an inorganic filler (E) per 100 parts by weight of the composition.

5. The polyoxymethylene resin composition of claim 3, consisting essentially of polyoxymethylene resin (A), polyether ester amide elastomer (B), acid-modified olefinic resin (C), and polydimethylsiloxane lubricant (D).

6. The polyoxymethylene resin composition of claim 4, consisting essentially of polyoxymethylene resin (A), polyether ester amide elastomer (B), acid-modified olefinic resin (C), and polydimethylsiloxane lubricant (D).

* * * * *